Sept. 9, 1941.   P. KOEHLER   2,255,065
DETECTOR DEVICE
Filed Aug. 22, 1940   3 Sheets-Sheet 1
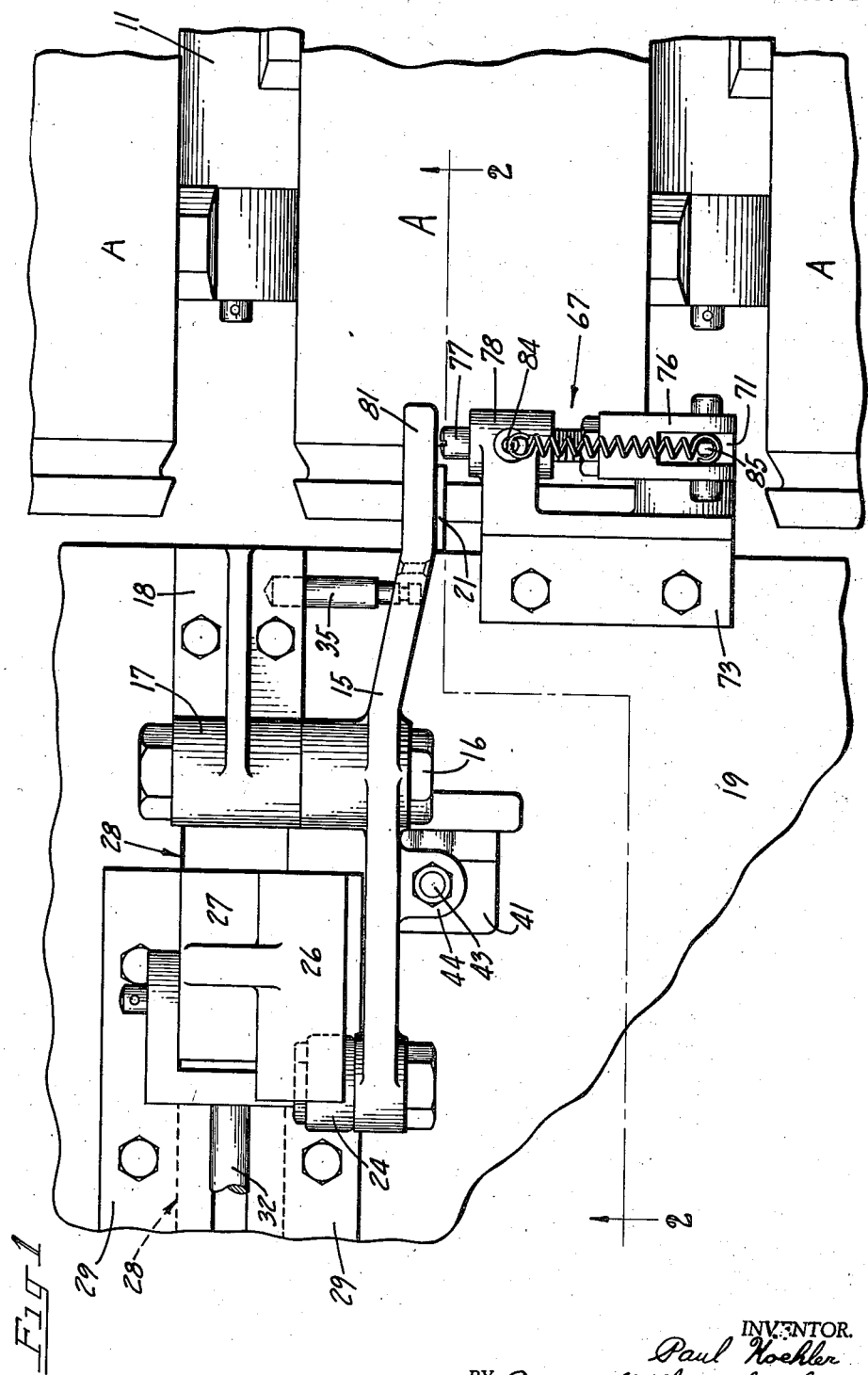

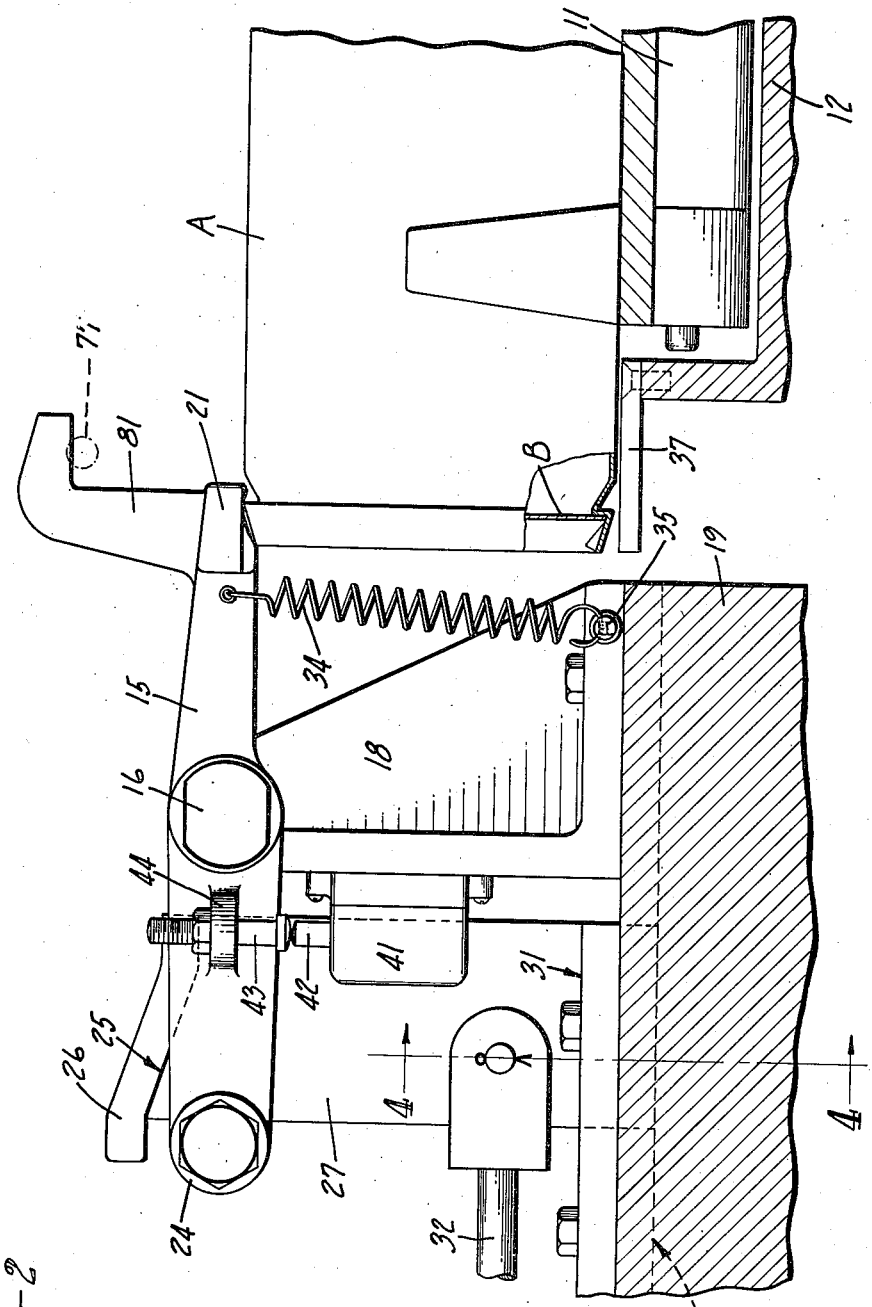

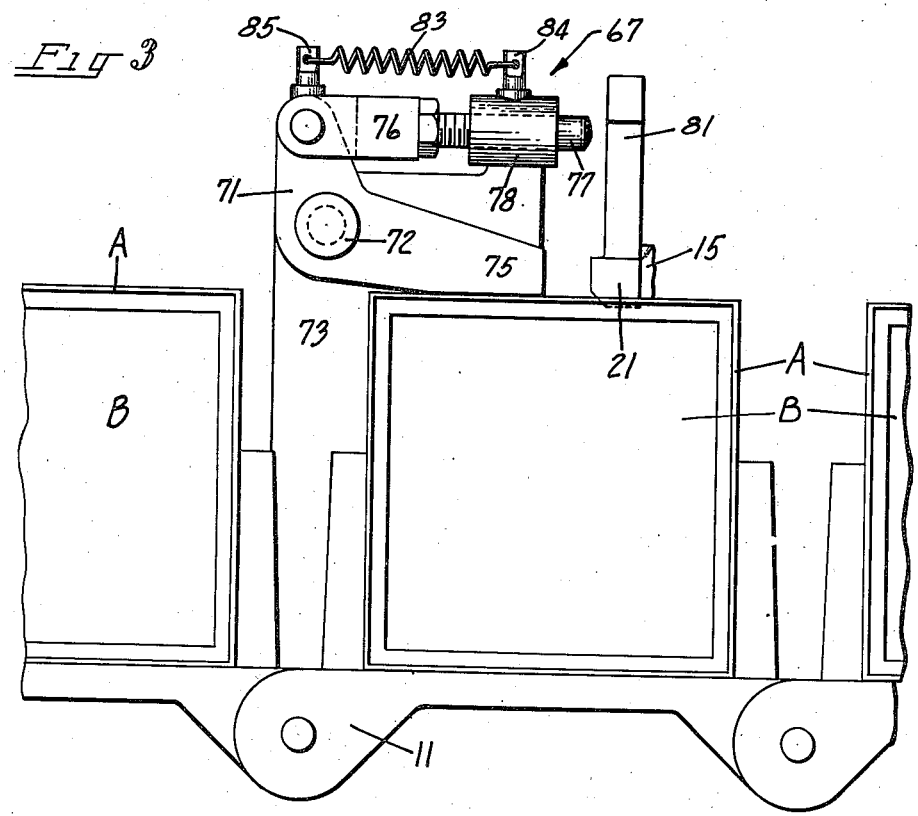
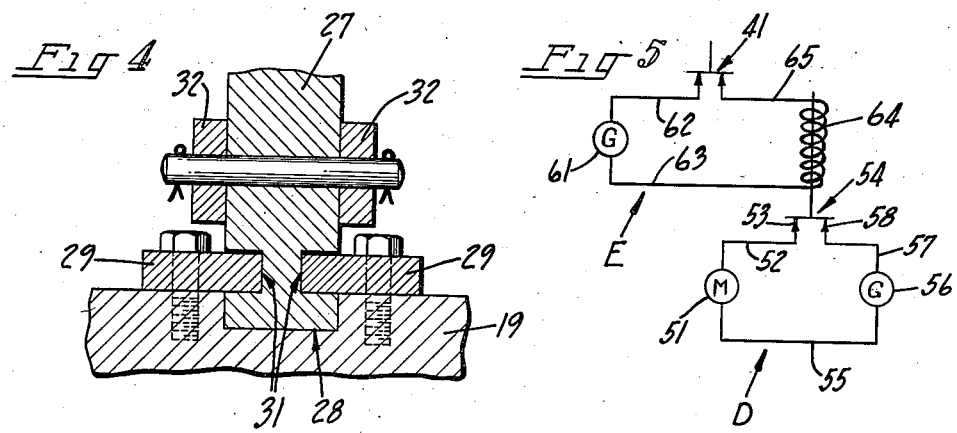

Patented Sept. 9, 1941

2,255,065

UNITED STATES PATENT OFFICE 2,255,065

DETECTOR DEVICE

Paul Koehler, Union, N. J., assignor to American Can Company, New York, N. Y., a corporation of New Jersey Application August 22, 1940, Serial No. 353,766

10 Claims. (Cl. 192—125)

The present invention relates to can end assembling machines and the like and has particular reference to detecting a can body which is without an end member and stopping the machine when such a body is detected. This is an improvement on the Can end assembling machine disclosed in United States Patent 2,200,276, issued May 14, 1940, to J. M. Hothersall et al.

In the manufacture of light weight fibre containers of the character disclosed in United States Patent 2,085,979, issued July 6, 1937, to J. M. Hothersall, the fibre end members of the can are preferably inserted within the open ends of the fibre can body and are secured in place by a folding over of a flange part on the body. In high speed production a can body sometimes skips by without an end member and sometimes the end feed fails to feed end members for insertion within the body. When such conditions prevail it is desirable to stop the machine to remedy the difficulty.

The instant invention contemplates a detector device which engages against the outside of the can bodies and when end members are omitted, presses the can body side wall inwardly and thereby operates to stop the machine. The invention further contemplates a detector device which is operable only when can bodies are passing through the machine so that the machine may be operated if desired when no can bodies are passing through it.

An object therefore of the invention is the provision of detector devices in a machine for assembling can end members with fibre can bodies wherein the detector device exerts a pressure on the outside of the can body wall so that can bodies without end members may be readily detected by a yielding of the body side wall.

Another object is the provision of such a detector device which operates to stop the machine when a can body without an end member is detected so that skipping of the end member may be remedied.

Another object is the provision of a detector device of this character which is rendered inoperable when no can bodies are passing through the machine so that the machine may be turned over for testing purposes and the like without can bodies passing through it where this is desired.

Numerous other objects and advantages of the invention will be apparent as it is better understood from the following description, which, taken in connection with the accompanying drawings, discloses a preferred embodiment thereof.

Referring to the drawings:

Figure 1 is a top plan view of a detector device embodying the instant invention, the view also showing can bodies in place to be tested, with parts broken away;

Fig. 2 is a sectional view taken substantially along the broken line 2—2 in Fig. 1, with parts broken away;

Fig. 3 is an end elevation of the device as viewed from the right in Fig. 1, with parts broken away;

Fig. 4 is a sectional detail taken substantially along the line 4—4 in Fig. 2; and Fig. 5 is a wiring diagram of the electrical apparatus used in connection with the detector device.

As a preferred embodiment of the invention the drawings illustrate principal parts of a can end assembling machine of the character disclosed in the above mentioned Hothersall Patent 2,200,276, in which rectangular, tubular fibre can bodies A having inserted end members B are carried through the machine and stopped at various working stations for the performance of work thereon. One of these stations contains a detector device which is illustrated in the drawings and which operates to press against one of the flat sides of the can body at a place adjacent the end of the body.

If an end member is in place in the body it reenforces the body side wall and thereby stiffens it sufficiently to resist the pressure of the detector device. The detector device is thereby prevented from stopping the machine and the can body proceeds to the other working stations.

If no end member is in place when the detector device comes in engagement with the body side wall, the latter yields under the pressure of the device and this permits the device to operate an electric switch which breaks certain electric circuits connecting with the electric motor which actuates the machine. The breaking of these circuits stops the motor and thus further operation of the machine so the detected can body may be removed and the cause for skipping its end member remedied.

There are preferably two of these detector devices located one adjacent each end of the path of travel of the moving can body so that both ends of the body may be tested. However, these detector devices are identical in construction and operation and therefore only one of them will be herein described and explained.

The can bodies are carried through the machine along a straight line path of travel and in a horizontal position, i. e., extending transversely of the machine and in an intermittent or step-by-step manner by an endless chain conveyor 11 (Figs. 1, 2 and 3). This conveyor may be actuated in any suitable manner operating in time with the other moving parts of the machine. The upper run of the conveyor is preferably guided by a runway 12 which may be secured to the main frame of the machine.

The detector device includes a substantially horizontal detector arm 15 which is mounted intermediate its length on a pivot pin 16 carried in a boss 17 of a bracket 18 bolted to a base 19 which may be secured to the main frame of the machine adjacent the path of travel of the can bodies in the conveyor 11. The inner end of the detector arm 15 extends inwardly toward and slightly above the path of travel of the outer end of the can body. This end of the arm is formed with a detector shoe 21 which is in vertical alignment with that portion of the can body that retains its end member.

The detector shoe 21 is normally held in spaced relation to the can bodies by a cam roller 24 (Fig. 1) which is carried on the outer end of the detector arm 15. The roller is adapted to operate against an inclined cam surface 25 of a cam 26 formed on a reciprocating slide block 27. The slide block moves in a slideway 28 (see also Fig. 4) formed in the base 19 and is retained against displacement by a pair of spaced and parallel gibs 29. These gibs are bolted to the top of the base 19 and extend into grooves 31 formed in the sides of the slide. The slide is preferably reciprocated in its slideway by a connecting link 32 which may be actuated in any suitable manner in time with the other moving parts of the machine.

The normal position of the slide 27 is further out than the position shown at the left of Fig. 2 and in this normal position the cam surface 25 engages the cam roller 24 and holds it in a depressed position. The cam roller is held in engagement with the cam surface 25 by a tension spring 34 having its upper end connected to the inner end of the arm 15 and its lower end connected to a pin 35 in the bracket 18. It is this cam surface and cam roller that retains the detector shoe 21 in its spaced relation to the can bodies A.

When a can body A is brought to rest in detecting position by the conveyor 11, the end of the body is directly under the raised detector shoe 21. The slide block thereupon moves through a forward stroke and shifts into the inward position shown in Fig. 2. This movement of the slide block shifts the cam 26 away from the cam roller 28 and thereby permits the tension spring 34 to rock the detector arm 15 and thus draw the detector shoe 21 downwardly into engagement with the upper flat side of the positioned can body A. This constitutes detection of a can end member B as hereinbefore explained. A support shelf 37 secured to the conveyor runway 12 extends under the can body and prevents tilting of the body when it is engaged by the detector shoe.

Stopping of the machine when a can body without a can end is detected is brought about by an electric switch 41 which is secured to the side of the bracket 18. The switch is provided with a movable spring held element 42 which engages against an adjustable screw 43 secured in a lug 44 formed on the outer end of the detector arm 15.

Hence when the detector arm 15 rocks to bring the detector shoe 21 into engagement with the can body, the screw 43 moves upwardly and thereby permits the switch element 42 to rise under its spring action. Normal movement of the switch element as when can bodies having end members located therein are passing through the machine, has no effect on the switch 41. However, when no end is in a can body and the flat side of the body is pressed inwardly by the detector shoe, the arm 15 rocks an abnormal distance and the switch element 42 is thereby permitted to rise sufficiently to open the switch 41. It is this action that stops the machine as will now be explained.

Reference should now be had to the wiring diagram in Fig. 5. This diagram discloses an operating circuit D and a control circuit E. The operating circuit includes an electric motor 51 which is connected by a wire 52 to one terminal 53 of a solenoid relay switch 54. The motor is also connected by a wire 55 to a source of electric energy, such as a generator 56. The generator is connected by a wire 57 to the other terminal 58 of the relay switch 54.

Hence when the relay switch 54 is closed against its terminals 53, 58 the operating circuit is complete. Electric energy passing from the generator 56 through this circuit excites the motor 51 and thereby keeps the machine in operation.

The relay switch 54 is maintained closed by the control circuit E. This circuit includes a separate source of electric energy such as an auxiliary generator 61. One side of this generator is connected by a wire 62 to the detector switch 41. The other side of the generator is connected by a wire 63 to a solenoid 64 which is a part of the relay switch 54. The solenoid is also connected by a wire 65 to the detector switch 41.

Hence as long as the detector switch 41 remains closed, the control circuit is complete and energy from the auxiliary generator 61 flows through the circuit and keeps the solenoid 64 energized. It is this energized solenoid that maintains the relay switch 54 in a closed condition.

When a can without an end member is detected and the detector switch is thereupon opened, the control circuit E is broken and the solenoid becomes de-energized. De-energization of the solenoid opens the relay switch 54 and this breaks the motor operating circuit D. The motor thus stops and this stops the machine until again started.

As hereinbefore mentioned the detector device is only operable when cans A are moving through the machine and is rendered inoperable when no cans are passing so that the machine may be kept in operation if desired. This is brought about by a detector locking device generally indicated by the numeral 67 in Figs. 1 and 3.

The detector locking device 67 includes a bell crank 71 which is mounted on a pivot pin 72 carried in a bracket 73 secured to the main frame 19 adjacent the detector device. The bell crank is formed with a long tail 75 which extends down into the path of travel of the cans moving through the machine on the conveyor 11. The crank is also secured by a clevis 76 to a horizontal locking plunger 77 which slides in a bearing 78 formed on the bracket 73.

This plunger is disposed at right angles to and in line with a hook element 81 (see also Fig. 2)

which is formed on the detector arm 15 adjacent and above the shoe 21. The plunger and the tail 75 of the bell crank are maintained under tension of a spring 83, one end of which is fastened in a pin 84 secured in the bearing 78 and the other end connected to a pin 85 secured in the bell crank 71.

Hence when cans A are passing through the machine the long tail 75 of the bell crank 71 rides on the cans and is thereby held up in a substantially horizontal position which keeps the locking plunger 77 withdrawn out of the path of travel of the detector arm hook 81 as shown in Fig. 3 as the arm rocks into and out of engagement with the cans. However, when there are no cans passing through the machine there is nothing to hold the tail 75 of the bell crank in the position shown in Fig. 3 and hence the spring 83 rocks the bell crank 71 toward the right as viewed in the figure and this depresses the tail 75.

This rocking movement of the bell crank 71 also forces the locking plunger 77 outwardly into the path of travel of the detector arm hook 81, the plunger engaging under the hook and thereby holding it and the detector arm 15 connected with it against movement. Actuation of the cam 26 thereafter has no effect on the detector arm and the detector is thereby rendered inoperable. This keeps the electric circuits D, E intact and thus permits turning over or testing of the machine.

When cans A again begin moving through the machine the tail 75 of the bell crank 71 rides up onto the cans and thereby rocks the bell crank sufficiently to withdraw the locking plunger 77 from engagement with the detector arm hook 81. This release of the detector arm permits it to again resume operation under the action of the cam 26 and thereby move into engagement with the cans to test for their can end members.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A detector device in a can end assembling machine for detecting fibre cans which fail to receive a can end member, the combination of means for exerting a pressure on a side of a fibre can body adjacent the end thereof so that the body side wall is pressed inwardly when there is no end member in place in the body, and devices operable upon the yielding of the body side wall for stopping operation of the machine so that the detected can may be ejected.

2. A detector device in a can end assembling machine for detecting fibre cans which fail to receive a can end member, the combination of a detector shoe movable into engagement with a side of a fibre can body adjacent the end thereof for exerting a pressure thereon so that the body side wall is pressed inwardly when there is no end member in place in the body, and devices operable upon the yielding of the body side wall for stopping operation of the machine so that the detected can may be ejected.

3. A detector device in a can end assembling machine for detecting fibre cans which fail to receive a can end member, the combination of a rocker arm carrying a detector shoe, means for rocking said arm and for thereby moving said shoe into engagement with a side of a fibre can body adjacent the end thereof for exerting a pressure thereon so that the body side wall is pressed inwardly when there is no end member in place in the body, and devices operable by said rocker arm when the can body yields for stopping the operation of the machine.

4. A detector device in a can end assembling machine for detecting fibre cans which fail to receive a can end member, the combination of a rocker arm carrying a detector shoe, means for holding said rocker arm in a position to allow a can to be placed in alignment with said detector shoe and for releasing said arm after positioning of the can, means for rocking said released arm to move said shoe into engagement with a side of a fibre can body adjacent the end thereof for exerting a pressure thereon so that the body side wall is pressed inwardly when there is no end member in place in the body, and devices operable by said rocker arm when the can body yields for stopping the operation of the machine.

5. A detector device in a can end assembling machine for detecting a fibre can which does not have a can end member, the combination of a rocker arm carrying a detector shoe, a slide cam for holding said rocker arm in a position to allow a can to be placed in alignment with said detector shoe and for releasing said arm after positioning of the can, a spring for rocking said released arm to move said shoe into engagement with a side of a fibre can body adjacent the end thereof for exerting a pressure thereon so that the body side wall is pressed inwardly when there is no end member in place in the body, and electric devices operable by said rocker arm when the can body yields for stopping the operation of the machine.

6. A detector device in a can end assembling machine for detecting fibre cans which fail to receive a can end member, the combination of a conveyor for propelling cans along a predetermined path of travel through the machine, means for exerting a pressure on a side of a fibre can body adjacent the end thereof so that the body side wall yields when there is no end member in place in the body, and devices operable upon the yielding of the body side wall for stopping operation of the machine so that the detected can may be ejected.

7. A detector device in a can end assembling machine for detecting fibre cans which fail to receive a can end member, the combination of an intermittently movable conveyor for carrying cans through the machine in a step-by-step manner, a rocker arm carrying a detector shoe disposed above the path of travel of the cans, means for normally holding said rocker arm in a position where its shoe is in spaced relation to said cans and for releasing said arm when a can is brought to rest adjacent said shoe, means for rocking said released arm to move said shoe into engagement with a side of a fibre can body adjacent the end thereof for exerting a pressure thereon so that the body side wall is pressed inwardly when there is no end in place in the body, and devices operable by said rocker arm when the can body yields for stopping the operation of the machine.

8. A detector device in a can end assembling machine for detecting a fibre can which is without a can end member, the combination of a conveyor for propelling cans along a predetermined path of travel through the machine, a detector shoe movable into engagement with a side of a fibre can body adjacent the end thereof to exert a pressure which moves the body side wall inwardly when there is no end member in place in the body, devices operable upon the yielding of the body side wall for stopping operation of the machine, and means for restraining said shoe from the actuation when no cans are being passed by said conveyor through the machine.

9. A detector device in a can end assembling machine for detecting a fibre can which is minus a can end member, the combination of a conveyor for carrying cans through the machine in a continuous procession and for bringing a can to rest for detection as to the presence or absence of its end member, a rocker arm carrying a detector shoe adjacent said conveyor for bringing said shoe into engagement with the positioned can to exert a pressure which presses the can body wall inwardly if an end member is not in proper place in the body, a plunger located adjacent said rocker arm, and a shifting element disposed in the path of travel of the cans and movable by engagement with the cans for moving said plunger into engagement with said rocker arm to hold it in inoperative position when cans are not passing through the machine on said conveyor, said shifting element also moving said plunger away from the rocker arm to release it for operation when cans are being conveyed through the machine.

10. A detector device in a can end assembling machine for detecting fibre cans which fail to receive can end members, the combination of a conveyor for carrying cans through the machine in a continuous procession and for bringing a can to rest for detection, a rocker arm carrying a detector shoe located adjacent said conveyor for bringing said shoe into engagement with the positioned can to exert a pressure on the side thereof and to press inwardly the body wall when there is no end member in proper position in the body, a hook member mounted on said rocker arm, a plunger disposed at an angle to said hook member and movable relative thereto, and a bell crank connecting with said plunger and having a long tail projecting into the path of travel of the cans which is engaged by the cans as they move through the machine, said tail rocking said bell crank when the tail is not engaged as when cans are not being conveyed through the machine to shift said plunger into engagement with said hook member and to lock the detector arm in inoperative position, so that the machine can be operated without cans or ends.

PAUL KOEHLER.